March 9, 1965     P. C. HANLON     3,172,673
SEALING RING ASSEMBLY OF INNER-OUTER RING TYPE
Filed July 3, 1961
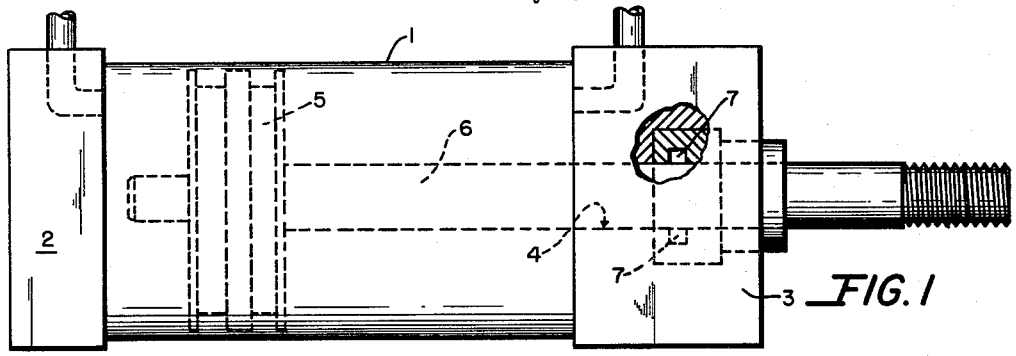
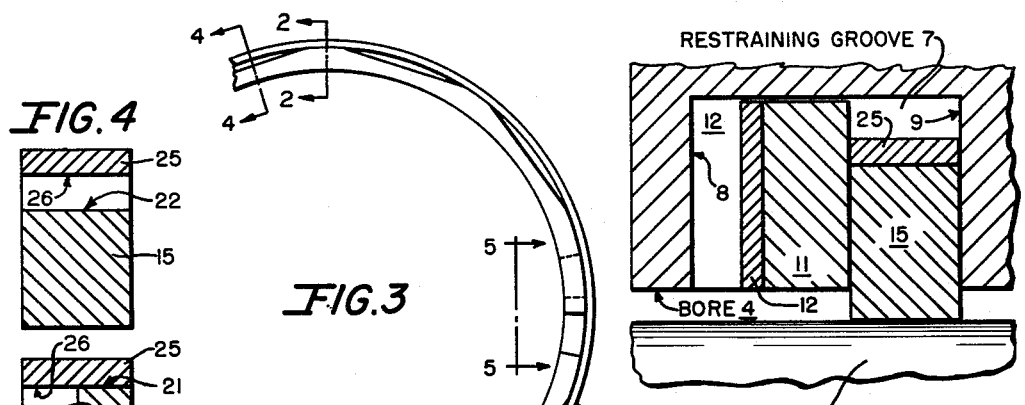
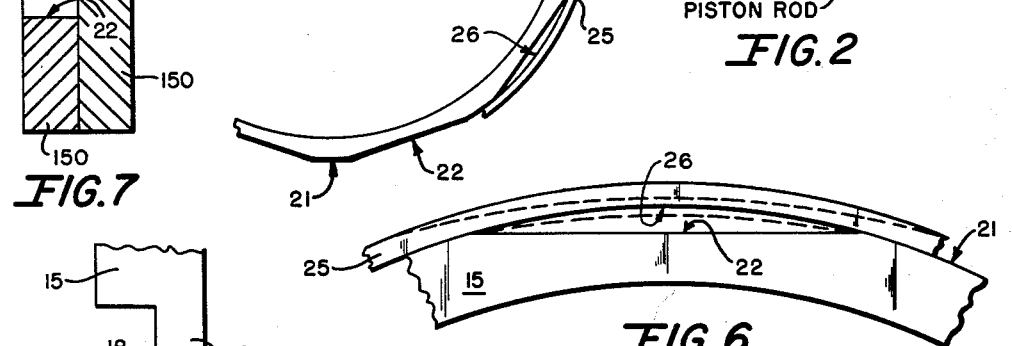
INVENTOR.
PAUL C. HANLON
BY Arthur H. Robert
ATTORNEY

3,172,673
SEALING RING ASSEMBLY OF INNER-OUTER RING TYPE
Paul C. Hanlon, Louisville, Ky., assignor to Dover Corporation, Washington, D.C., a corporation of Delaware
Filed July 3, 1961, Ser. No. 128,295
5 Claims. (Cl. 277—158)

This invention relates to a sealing ring assembly of the type intended for use within the bored end cap of an aircraft hydraulic actuator cylinder where it extends around the piston rod to prevent the leakage of hydraulic fluid from the interior of the cylinder axially along the rod.

A typical hydraulic actuator cylinder comprises: a cylindrical casing; a pair of end caps closing opposite ends of the casing, one end cap being bored to receive the piston rod; a piston dividing the interior of the casing into two compartments; and a piston rod connected to the piston and projecting from the interior of the cylinder outwardly through the bored end cap. The usual aircraft specifications permit a small amount of leakage axially along the piston rod where it passes through the bored end cap. However, to control the magnitude of this leakage, such specifications require the use of fluid sealing means between the piston rod and the bore wall of the end cap.

Heretofore a satisfactory seal has been provided by a yieldable plastic (or non-metallic) sealing ring encircling the rod. However, the supersonic speeds of modern aircraft equipment have caused the operating pressures and temperatures to rise to values of 3,000 to 4,000 p.s.i. and 500 to 1,000° F. at which plastic sealing rings cannot be used. As a consequence, the industry has resorted to the use of metal sealing ring assemblies of different types.

One proposed type of metal sealing ring assembly comprises an inner split ring surrounded by an outer split ring. An assembly of this inner-outer split ring type is intended to be mounted snugly but slidably upon the rod and to project radially therefrom into a surrounding annular restraining groove formed in the bore wall of the bored end cap. This ring assembly is prevented from moving inwardly with the rod by a spring-loaded ring which is located in the groove between the sealing ring assembly and the innermost radial face of the groove. The assembly is prevented from moving outwardly with the rod by its sealing engagement with the outermost radial or "sealing" face of the groove against which it is pressed by the strong action of the spring-loaded ring and by the supplementary action of the fluid pressure in the cylinder.

A conventional metal sealing ring assembly of the inner-outer split ring type, which is intended for use, say, with piston rods having a 1.0 inch O.D. (outside diameter) with a tolerance of plus or minus .002 inch, comprises: a split stiffly resilient inner ring which is biased inwardly toward a minimum I.D. (inner diameter) somewhat smaller than .998 inch so that it will contract into snug slidable engagement with the rod; and a split stiffly resilient outer ring which is biased inwardly toward a minimum I.D. somewhat smaller than the O.D. of the inner ring so that it will contract tightly against the inner ring and thus serve as a stiffly resilient spring which reinforces and strengthens the inward bias of the inner ring and the sealing pressure with which the inner ring slidably grips the piston rod.

The inner ring of this conventional assembly has its split ends overlapped in opposed axially-facing engagement. Its overlapping end portions cooperatively form two angularly-spaced radially-extending open-ended gaps, one of which is also open in one axial direction and the other of which is also open in the opposite axial direction.

The outer ring of this conventional assembly usually has the end faces of its split end portions arranged in opposed slightly-spaced face-to-face relationship.

It is necessary to keep the outer ring gap angularly offset from both inner ring gaps in order to prevent the direct escape of fluid from the cylinder successively through the outer and inner ring gaps to atmosphere. To this end, conventional inner-outer split ring structures also include dowel means keying the rings together with the inner gaps angularly offset from the outer gaps.

The present invention is directed to an improved form of sealing ring assembly of the inner-outer metal ring type. The principal object of the present invention is to provide an improved assembly which is of substantially reduced weight, which eliminates the need for doweling inner and outer rings together and which provides a more effective seal against leakage.

Another important object is to provide an improved sealing ring assembly of the inner-outer ring type which utilizes a uniquely advantageous arrangement for resiliently reinforcing and maintaining the inner bias of the inner ring and thereby increasing the sealing pressure between that ring and the rod.

The objects of my invention may be achieved in a sealing ring assembly comprising: a stiffly-resilient inwardly-biased split inner ring of conventional character; and a stiffly-flexible continuous outer ring closely assembled on the split inner ring to bias it inwardly; the adjacent peripheries of both rings cooperatively providing a series of angularly-spaced closely-engaged portions separated by an interposed series of angularly-spaced unengaged portions.

More particularly, the outer ring is arranged so that its angularly-spaced portions, which are in close engagement with the inner ring, urge the inner ring toward (and tend to hold the inner ring in) a condition of maximum contraction. When the split inner ring is radially expanded, as it must be to receive even the smallest piston rod for which it is designed, the engaged portions of the continuous outer ring are forced to expand radially therewith. As each pair of engaged portions of the continuous outer ring move outwardly, they pull on the opposite ends of the interposed unengaged portion of the outer ring and thus tend to stretch it endwise.

The present invention makes use of this endwise stretching force by constructing the unengaged portions of the outer ring so that, when thus pulled, they can and will stretch endwise and thereby not only accommodate the requisite expansion of both rings without subjecting the outer ring to breakage but also, in doing so, increase the tension of the outer ring with a consequent increase in the inward biasing force of the outer ring, the sealing pressure between rings and between the inner ring and the rod.

The invention is illustrated in the accompanying drawings wherein:

FIG. 1 is a schematic view of a hydraulic actuator cylinder containing an annular restraining groove in which my invention may be incorporated;

FIG. 2 is an enlarged fragmentary view taken cross-sectionally through a restraining groove containing my improved sealing ring assembly and showing the relationship of its rings at a high spot and its relationship as a whole to the groove, the loading assembly and the piston rod, this view of the ring assembly corresponding to one taken along line 2—2 of FIG. 3;

FIG. 3 is an axial face elevational view of slightly more than one-half of my ring assembly;

FIG. 4 is an enlarged cross-sectional view taken along line 4—4 of FIG. 3 and showing the relationship of its rings at a low spot;

FIG. 5 is an elevational view of the split end portion of the inner ring along its inner periphery, this view corresponding to one taken along line 5—5 of FIG. 3;

FIG. 6 is an enlarged axial face elevational view of a portion of the ring shown in FIG. 3, this view indicating the relationship of the flattening action of a portion of the outer ring to a single low spot which is interposed between two high spots of the inner ring;

FIG. 7 is a sectional view of a modified sealing ring assembly, the right half of this modified assembly corresponding to the right half of the assembly of the first embodiment as seen in FIG. 2 and the left half of this modified assembly corresponding to the left half of the first embodiment as seen in FIG. 4; and FIG. 8 is an elevational view of a fragmentary portion of the inner periphery of the FIG. 7 embodiment, the left half of this view showing the split end portions of one modified inner ring.

*Conventional structure*

The double-acting hydraulic cylinder, shown in FIG. 1, conventionally comprises: a cylindrical casing 1; an end cap 2 closing one end of the casing; an end cap 3 closing the opposite end thereof and being bored at 4 to receive a piston rod; a piston 5 dividing the interior of the casing into at least two compartments; and a piston rod 6 connected to the piston 5 and projecting from the interior of the cylinder casing 1 outwardly through the bore 4 of the end cap 3.

The bore wall contains an annular restraining groove 7 of channel shape in cross-section having an inner radial wall 8, an outer radial wall 9 and an intervening or interconnecting bight wall. This restraining groove 7 is provided to receive a spring-loaded sealing ring assembly which encircles the piston rod 6 and which functions to prevent the leakage of hydraulic fluid from the cylinder axially along the piston rod 6 through the bore 4 of end cap 3.

The loaded sealing ring structure shown in FIG. 2 comprises an axial load ring 11 interposed between an axial load spring 12 on one side and, on the other side, a sealing ring assembly constructed in accordance with the present invention. The spring 12 causes load ring 11 to clamp the sealing ring assembly against the outer radial wall or sealing face 9 of the annular restraining groove 7.

The sealing ring assembly of FIG. 2 is conventional insofar as it includes: a stiffly resilient metal inner ring 15 having end portions 16 and 17, split, reduced and overlapped to provide radially-extending open-ended gaps 18 and 19, one of which also opens axially in one direction and the other of which opens in the axially opposite direction, said end portions also providing, between gaps 18 and 19, opposed axially-facing surfaces which remain in overlapping slidable engagement at all times so as to resist the leakage of fluid axially from one gap to the other over the entire expansion-retraction range of the inner ring; and a stiffly resilient metal outer ring 25 closely encircling the inner ring and serving to bias it inwardly in the ring contracting direction. The outer ring 25 tends to reduce the circumference of the inner ring and the "rotational" or circumferential dimension of its gaps 18 and 19. The inner ring 15 is split and biased inwardly to a relaxed or free diameter somewhat smaller than the diameter of the smallest piston rod for which it is designed.

*New structure*

A sealing ring assembly, made in accordance with my invention, differs from conventional assemblies in at least two respects, viz: (a) the adjacent peripheries of the rings 15 and 25 are constructed so that they cooperatively provide a series of angularly-spaced closely-engaged portions separated by an interposed series of angularly-spaced unengaged portions; and (b) the outer ring 25 is made continuous or unsplit and dimensioned so that its engaged portions urge the inner ring toward and tend to hold it in a contracted condition. However, the inner ring 15 must be initially expanded in order to be mounted on a piston rod 6. The outer ring 25 must accommodate that expansion; hence, when the engaged portions of the inner ring 15 moves radially outward, the engaged portions of the outer ring 25 must also move radially outward. Accordingly, the outer ring is made to yield to the radial expansion of the inner ring by constructing the unengaged portions of the outer ring in a manner causing each of them to elongate circumferentially under the influence of the stretching force or pull to which it is subjected at opposite ends by the radially expanding engaged portions at its opposite ends.

While various embodiments of my invention may be made, the embodiment illustrated gives good results. In this embodiment, the outer periphery of the inner ring 15 is characterized by one series of angularly-spaced high spots 21 separated by an interposed series of low spots 22 while the adjacent inner periphery of the outer ring 25 is characterized by a series of angularly-spaced portions engaging the high spots 21 of the inner ring and an interposed series of unengaged portions 26 which are outwardly spaced from the low spots 22. I presently prefer a circular shape for the inner periphery of the outer ring and a polygonal shape for the outer periphery of the inner ring with the high spots 21 of the inner ring arcuately curved to conform to the circular shape of the outer ring and with the low spots 22 of the inner ring extending in a straight line from one high spot to the next.

The split inner ring 15 may be and preferably is made somewhat on the order of a disc-like ring which is to say, that, cross-sectionally, the axial dimension of its metal circumference is smaller than the radial dimension thereof. The continuous outer ring 25 may be and preferably is made somewhat on the order of a band which is to say that, cross-sectionally, the axial dimension of its metal circumference preferably is larger than its radial dimension. Theoretically, the axially dimensions of both the inner ring and the outer disc should be equal to each other. Practical considerations, however, seem to require that the axial dimension of the outer ring be slightly larger than that of the inner ring say, on the order of .0005".

With this arrangement, the circular unengaged portions 26 of the outer band 25, will flatten radially inward under the influence of the pulling forces to which their opposite ends are subjected when the inner ring expands. It will be appreciated that, in accommodating the outer expansion of the polygonal inner ring, the circular outer band progressively changes from a circular shape toward the polygonal shape of the inner ring.

A sealing ring assembly made in accordance with my invention has a number of advantages. It enables the weight of the total assembly to be reduced by eliminating doweling and by making it possible to construct the sealing ring assembly on a smaller scale, either axially or radially or both.

The use of a continuous outer ring makes it possible to increase the inwardly directed pressure of the outer ring against the inner ring and thus correspondingly increase the effectiveness of the seal which the engaged portions of the outer ring provide over the outer end opening of the radially-extending gaps 18 and 19 in the inner ring. A continuous outer ring makes it possible to increase the inward bias of the inner ring very substantially and thus correspondingly increase the sealing pressure which that inner ring is capable of exerting against a given piston rod. At the same time, it minimizes the difference between the sealing pressures which the inner ring may exert against undersized and oversized rods of the same order. In other words, the difference in the sealing pressure which the inner ring exerts against an undersized one inch rod (.998") and the pressure which the same ring exerts against an oversized one inch rod (1.002″), is larger than that obtained when both rings are split but such difference is relatively small in comparison with seals of the interference type using a continuous sealing ring to grip the rod. While the sealing pressure of the inner ring is substantially increased, the frictional drag of that inner ring on the rod is not necessarily increased and may, in fact, be decreased because the present invention enables the inner ring to be made substantially thinner axially than has been possible heretofore with a corresponding reduction in frictional contact area.

A thin inner ring has the further advantage of insuring a continuous line of contact between that ring and the piston rod even when the piston rod is canted in relation to the longitudinal axis of the bore in the bored end cap. With a continuous line of contact and a high contact pressure, a good sealing action is certain.

Modification

In the modification, which is illustrated in FIGS. 7 and 8, the outer band or ring 25 remains as before but two axially-thinner inner rings 150 are substituted for the one inner ring 15 of the first embodiment. Furthermore, each inner ring 150 has the end faces of its end portions 160 and 170 arranged to face each other "circumferentially" with a small butt clearance space 180 therebetween. In use, the two inner rings 150 may be assembled within the one outer ring 25 preferably with the butt space 180 of one inner ring angularly offset 180° from the butt space of the other inner ring. The shape of the inner and outer rings is otherwise unchanged from that of the first embodiment.

This second embodiment has all of the advantages of the first embodiment plus an additional advantage in that the elimination of the overlapping end portions and the substitution of spaced butt end portions renders the modified structure of FIGS. 7–8 less expensive to manufacture. The butt space between the end faces of the end portions 160 and 170 is of the order of 1/32 of an inch.

It will thus be seen that I have provided an annular sealing ring assembly of the inner-outer ring type, which is intended to be mounted snugly but slidably on a reciprocating rod 6 and prevented from moving axially with the rod 6 by the side walls 8 and 9 of a surrounding restraining groove 7 into which the annular sealing ring assembly radially projects. This assembly comprises: a stiffly-resilient inwardly-biased split ring 15 for snugly embracing the rod 6, this ring having an unmounted I.D. smaller than its mounted I.D. and a series of integral circumferentially-spaced outwardly-facing portions, which tend to expand radially outward, when heated; a stiffly-resilient flexible continuous ring 25 preferably surrounding the inner ring 15 and having integral portions including a corresponding series of angularly-spaced portions connected to (preferably in contact with) a corresponding series of angularly-spaced portions 21 of the split ring 15 and operative, through such connections, to bias said split ring 15 inwardly to an I.D. smaller than its mounted I.D., said continuous or endless ring 25 having a series of free portions 26, one between each pair of its angularly-spaced connected portions; said split ring 15 being operative, as it tends to expand radially outward, to apply outwardly-directed forces to the connected portions of the continuous ring 25 and thereby urge them outward, said connected portions of the continuous ring being operative, as they expand or are urged outwardly, to exert circumferentially-directed stretching forces on opposite ends of said free portions 26. In this way, the connections (at opposite ends of the free portions) are pulled further apart so as to flatten or straighten out such free portions.

The restraining groove 7 is shown in FIGS. 1–2 as being formed in one integral part of the end cap. It will be understood, however, that it is cooperatively formed by at least two parts, e.g., one part forming the bight and one side wall of the groove and the other relatively removable part forming the other side wall thereof. The construction is such as will enable the sealing ring assembly to be inserted into the groove 7 when it is partly formed by two walls of the one part before the other part is put in place. This is necessary because obviously this assembly cannot be sprung into the groove 7 after it is fully formed.

Having described my invention, I claim:
1. An annular sealing ring assembly of the inner-outer ring type, which is intended to be mounted snugly but slidably on a reciprocating rod and prevented from moving axially with the rod by the side walls of a surrounding restraining groove into which the annular sealing ring assembly radially projects, comprising:
(A) a stiffly-resilient inwardly-biased split inner ring having an unmounted I.D. smaller than its mounted I.D.; and
(B) a stiffly-resilient flexible continuous outer ring surrounding the inner ring,
 (1) said continuous outer ring
  (a) having a series of angularly-spaced contacting portions in operative engagement with a corresponding series of angularly-spaced contacting portions of the split inner ring,
  (b) being operative, through such engagements, to bias said split ring inwardly to an I.D. smaller than its mounted I.D. and
  (c) being out of operative engagement with the inner ring along free inner and outer ring portions between said contacting portions.

2. The assembly of claim 1 wherein: said split inner ring has an outer peripheral surface characterized by angularly-spaced high spots with interposed low spots, the high spots providing said contacting portions and the low spots providing said free portions.

3. The assembly of claim 1 wherein: said continuous outer ring is in the form of a circular band having an axial dimension greater than its radial thickness.

4. The assembly of claim 3 including: two split inner rings arranged within said band.

5. The assembly of claim 3 wherein: the unengaged free portions of said circular band flatten radially inwardly as said closely-engaged portions expand radially outward.

References Cited in the file of this patent

UNITED STATES PATENTS

| | | |
|---|---|---|
| 1,424,655 | Kurtz | Aug. 1, 1922 |
| 1,504,342 | Hauber | Aug. 12, 1924 |
| 1,910,917 | Harrington | May 23, 1933 |
| 2,228,841 | Norton | Jan. 14, 1941 |
| 2,914,348 | Kroekel | Nov. 24, 1959 |
| 2,927,831 | Tuczek | Mar. 8, 1960 |

FOREIGN PATENTS

| | | |
|---|---|---|
| 65,063 | Sweden | Apr. 24, 1928 |
| 614,672 | Germany | June 21, 1935 |
| 693,130 | Germany | July 3, 1940 |